Patented Aug. 28, 1934

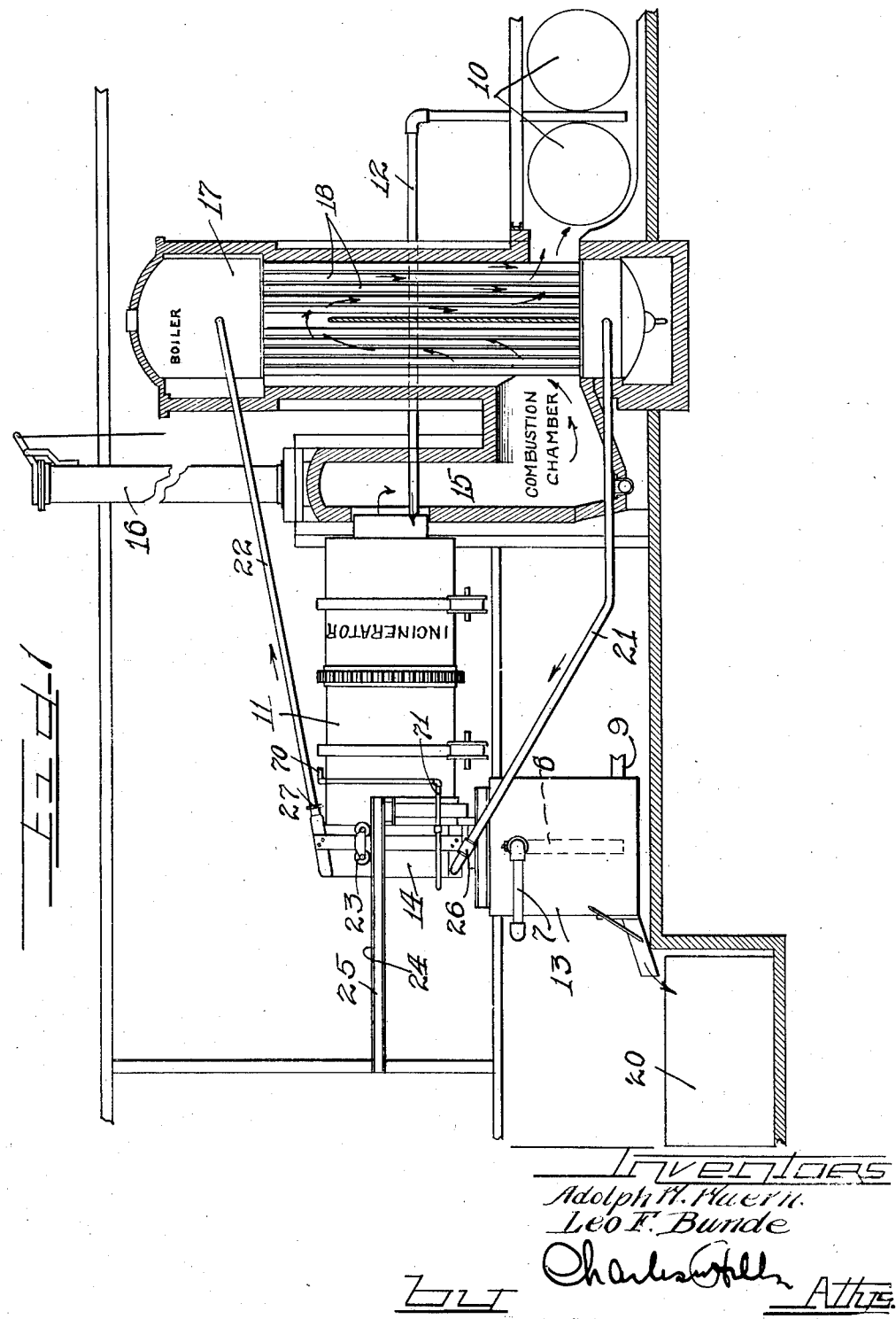

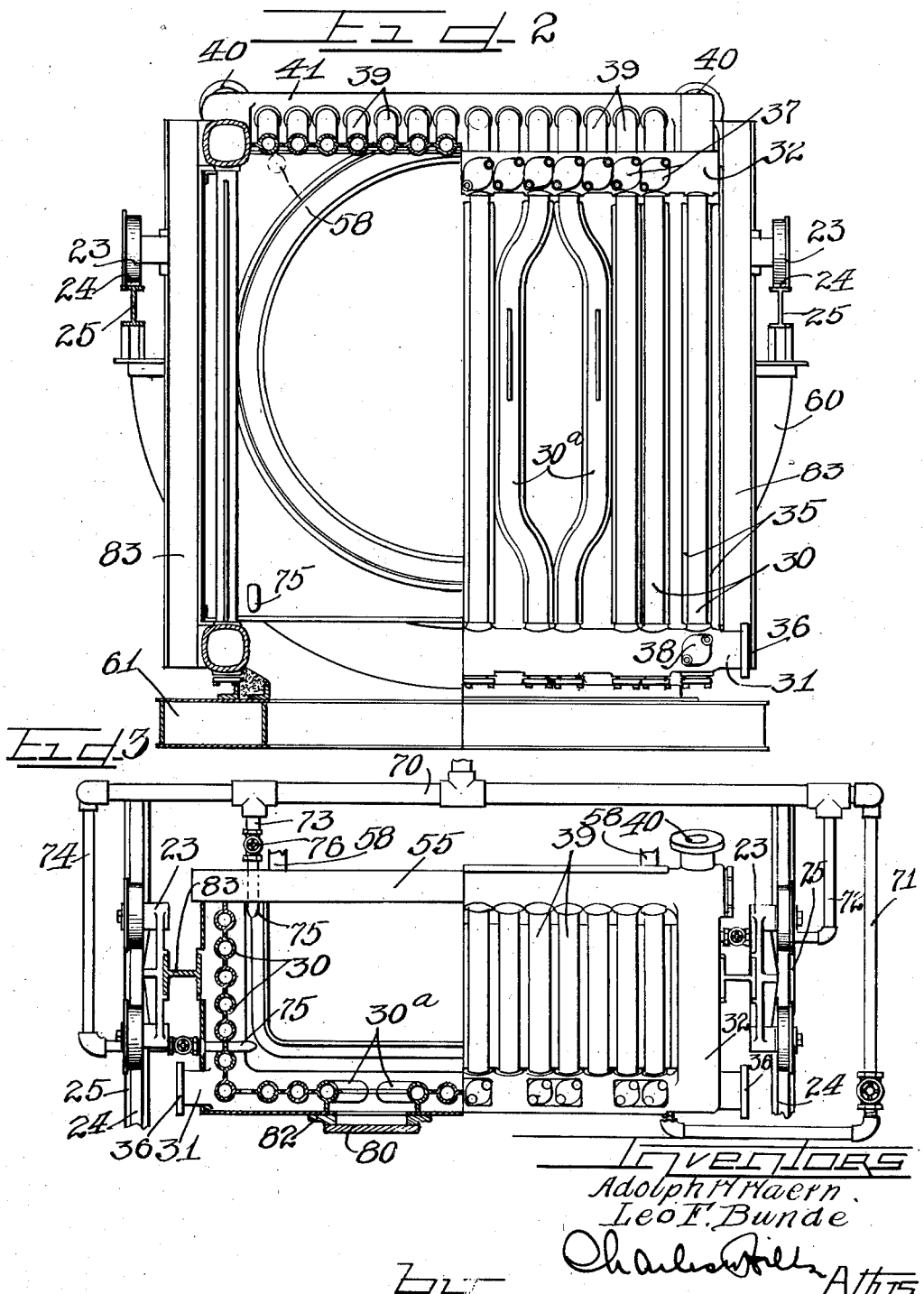

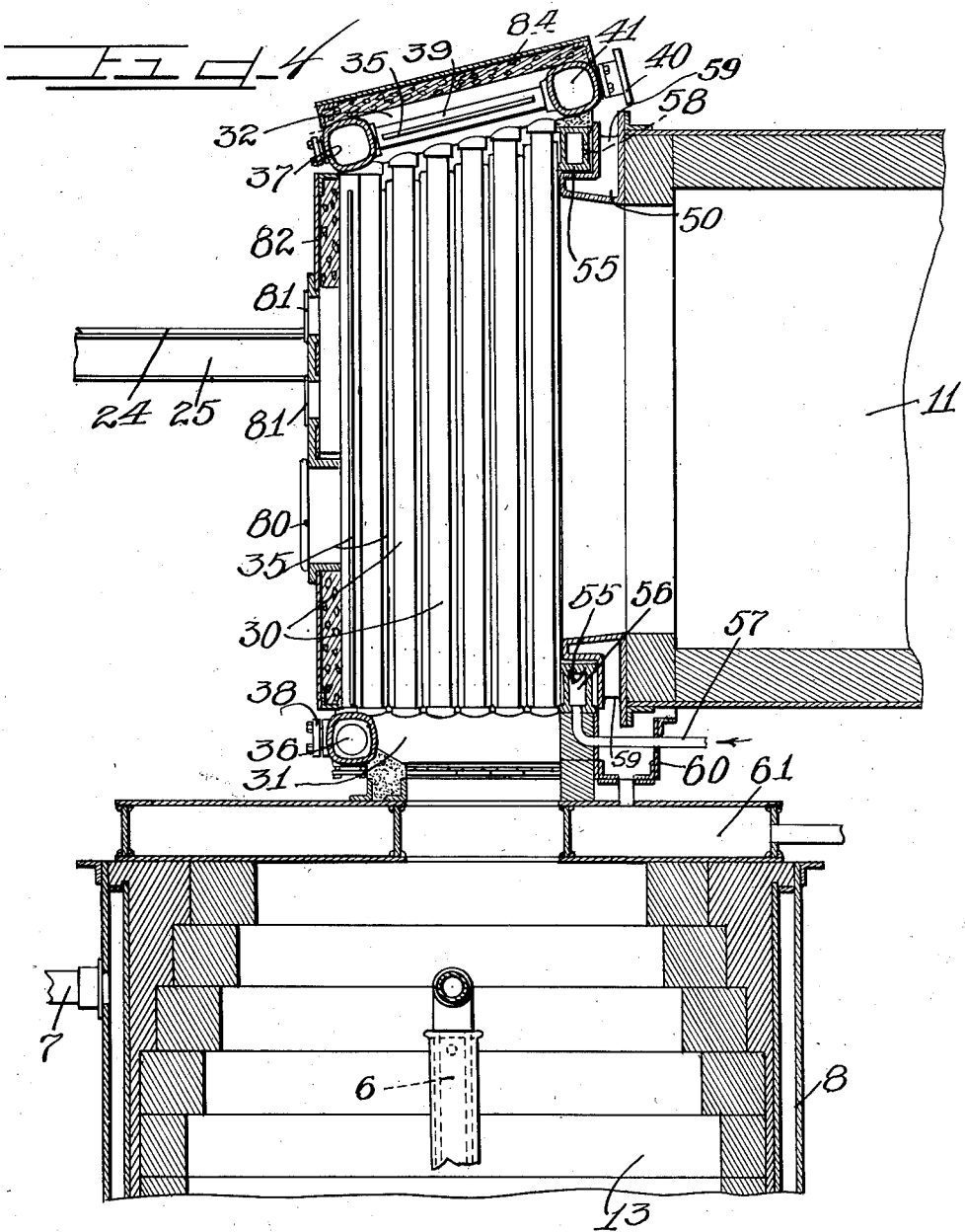

1,971,358

UNITED STATES PATENT OFFICE 1,971,358

WASTE HEAT RECOVERY APPARATUS

Adolph W. Waern and Leo F. Bunde, Wisconsin Rapids, Wis., assignors to Nekoosa-Edwards Paper Company, Port Edwards, Wis., a corporation of Wisconsin Application April 8, 1932, Serial No. 603,980

8 Claims. (Cl. 122—7)

This invention relates to a waste heat recovery system.

In the patent to A. W. Waern No. 1,833,386 granted November 24, 1931 there is described a system of apparatus adapted for use in processes involving the smelting of carbonaceous materials for the recovery of inorganic chemical values and utilization of their heat value.

This invention includes improvements in the system of apparatus disclosed in Patent No. 1,833,386.

More specifically this invention relates to an improved connection for a stationary smelting furnace and a rotating furnace whereby part of the heat of the materials passing through the connection is withdrawn from the stationary furnace-rotating furnace zone and used to generate steam with great efficiency in other parts of the system.

While this invention will be hereinafter particularly described in connection with a somewhat specific recovery system for the burning of black liquor as obtained in the alkaline digestion of cellulose material for the production of paper pulp it is to be understood that this invention is useful as a connection between any rotating drier or furnace and a stationary furnace in any system where hot materials, either solid, gaseous or both, pass between the two furnaces.

In the recovery of the inorganic chemical values and utilization of the heat content of black liquor as obtained in the sulfate and soda processes of producing wood pulp, the typical recovery process involves the steps of:

1. Concentrating the black liquor by evaporation;
2. Burning the concentrated black liquor in a rotary furnace or incinerator to produce "black ash";
3. Smelting the "black ash" in a stationary furnace to fuse off the inorganic compounds in the black ash and utilize the heat content of the burning organic materials to produce additional black ash in the incinerator, generate steam for general plant use and concentrate the black liquor as obtained from the digesters;
4. Leaching out the inorganic compounds fused off in the smelting furnace for reuse in the digestion of the cellulose material.

In a process containing the above listed steps, which is known as the rotary incinerator process, the hot black ash from the rotating incinerator or furnace is allowed to drop into a vertical stationary furnace (the smelting furnace) where it is burned. The hot gases from the smelting furnace travel countercurrent to the flow of black liquor and resulting black ash in this system and pass upwards from the vertical furnace through a connection into the rotating furnace. The black ash must likewise also pass through this connection. Since both the solid material and the gases passing through this necessary connection are at very high temperatures we have found that the efficiency of the recovery system is greatly enhanced by removing part of the heat from this zone to directly generate steam for use in other parts of the system.

It is therefore an object of this invention to provide a connection for a stationary vertical furnace and a rotating substantially horizontal furnace capable of efficiently removing part of the heat content of the materials passing through the connection for the generation of steam usable in other parts of the system.

It is a further object of this invention to provide a heat exchanger connection between a rotating substantially horizontal furnace and a vertical furnace which is readily movable to permit access to the interior of the furnaces.

Another object of this invention is to provide a heat exchanger connection between a rotating furnace and a stationary furnace permitting free passage of materials therethrough.

Other and further objects of this invention will become apparent as the description proceeds.

On the drawings:

Figure 1 is a diagrammatical view, partly in section, of a system of apparatus for the recovery of waste heat, showing the improved rotating furnace or incinerator-smelting furnace connection according to this invention.

Figure 2 is an end elevational view of the incinerator-smelting furnace connection with the cover plate removed and with parts in section.

Figure 3 is a top view of the incinerator-smelting furnace connection with the top cover plate removed and with parts in section.

Figure 4 is a fragmentary vertical sectional view of the incinerator-smelting furnace connection showing parts of the smelting furnace and the incinerator.

As shown on the drawings:

In Figure 1 the reference numeral 10 indicates disc evaporators in which the black liquor is concentrated. 11 is a rotary furnace. 12 is a pipe line through which the concentrated black liquor is fed from the disc evaporators 10 to the incinerator or rotary furnace 11. 13 is a stationary vertical furnace having a blow pipe 6 extending to the interior of the furnace to furnish sufficient air for combustion of black ash from the incinerator. The reference numeral 14 indicates the smelter-incinerator connection of this invention. 15 is a combustion chamber in which the gases from the furnace 13 after passing through the rotary incinerator 11 are thoroughly burned. Additional air may be added to the gases at this point to complete the combustion.

The path of the black liquor through the system is therefore from the disc evaporators 10 through pipe line 12 into the rotary incinerator 11 wherein the black liquor is dehydrated and partly burned to form "black ash". The "black ash" passes through the connection 14 and drops into the smelting furnace 13 wherein the organic materials are burned and the inorganic values fused off into a leaching tank 20 where they are dissolved and reused in the digesters for the preparation of paper pulp.

The gases travel countercurrent to the travel of the black liquor and therefore pass upwards from the smelting furnace 13 through the connection 14, through the incinerator 11 and into the combustion chamber 15, where they are thoroughly burned. If desired part of these gases may be passed up the stack 16 to the atmosphere. In the normal course of operation however the burning gases are passed around or through boiler tubes 18 in a boiler 17. After leaving the boiler the remaining heat content of the gases is utilized in the disc evaporators 10 for concentrating and heating up the black liquor.

As shown in Figures 1 and 4, the smelting furnace 13, which is of the type more fully described and claimed in the U. S. Letters Patent No. 1,661,742 granted to A. W. Waern on March 6, 1928, is provided with an air chamber 8 surrounding the side walls of the furnace. Air from any source is introduced through the pipe 9 and passes through the chamber 8 wherein it is heated by radiation from the furnace. The hot air leaves the chamber 8 through a pipe 7 located near the top of the furnace and is fed to the interior of the furnace through a water cooled blow pipe 6. Only a sufficient amount of air to promote combustion of the black ash is introduced at this point since it is necessary to maintain reducing conditions in the smelting furnace to prevent the oxidation of the inorganic chemical values.

It is evident from the above description that any connection between the vertical and rotating furnaces is subjected to terrific heat. Connections between these furnaces in this type of recovery system have heretofore necessarily been heavily lined with heat resisting fire brick and other insulating material to prolong their life. We have found however that if a heat exchanger connection is used and part of the heat taken from this zone to generate steam which is fed to the boiler 17 a highly efficient operation results with great saving in heat economy.

We therefore propose to feed water from the bottom of the boiler 17 through pipes 21 (a pipe 21 is located on each side of the boiler and connection 14) to the bottom of a heat exchanger connection as will be hereinafter more fully described. Water circulating through this heat exchanger connection becomes heated from the hot gases and black ash material passing through the connection and circulates back to the boiler in the form of steam or hot water through pipes 22 (a pipe 22 is located on each side of the boiler and heat exchanger connection 14).

As shown in Figure 4 we propose to use a water cooled lip such as is described and claimed in U. S. Patent No. 1,833,386 in conjunction with our heat exchanger connection. The water cooled lip comprises a lip member 50 having a radial cross section substantially the shape of an L. Said member 50 is provided with an annular inner surface of less diameter at its outer edge than at its incinerator adjacent edge to permit the passage of products from the incinerator to the furnace. This provides an annular lip of substantially frusto-conical form being open at its periphery. As is more fully described in Patent No. 1,833,386 the lip member 50 is provided with a plurality of equally spaced webs or partitions 59 (Fig. 4) extending radially from its frusto-conical portion and terminating short of the periphery from the lip member to define a plurality of circumferentially disposed pockets therebetween. The lip member 50 is securely fastened to the incinerator and rotates therewith.

The back wall of our heat exchanger connection comprises a substantially rectangular shaped hollow water wall 55 having a hollow core 56 for the circulation of water therethrough. Water is introduced into this water wall 55 at the bottom through a pipe line 57 and circulates through the hollow core 55 to the top of the wall which is provided with openings 58 for flowing the water into the circumferentially disposed pockets formed between the webs 59 of the lip member 50. As shown in Figures 2 and 3 the openings 58 are equipped with pipes to direct the water into the radially disposed pockets at a point below the top center of the rotating lip 50. If desired an additional spray nozzle may be provided at the top center to spray additional water into the pockets.

As the radially disposed pockets between the webs 59 of the lip member 50 start on their downward path of rotation the water therein is discharged into a receiving pan 60 circumferentially disposed around the lower half of the rotating lip. Said receiving pan 60 is connected to a water pan 61 which forms the top part of the smelting furnace 13. The now heated water from the pan 61 may be used as feed water for the boiler or in any part of the plant wherein hot water is used.

The heat exchanger connection of this invention includes a bottom U-shaped header pipe 31 having openings 36 on each side and being equipped with a plurality of caps or bonnets 38 to facilitate cleaning. The header pipe 31 is fitted with a plurality of vertically extending water tubes 30, and 30a. The tubes 30a are bowed to permit access to the interior of the connection through manholes 80 and peepholes 81 provided in an insulated cover plate 82. The entire connection is gas-tight being covered in the front with the insulated cover plate 82 and at the top with an insulated top cover plate 84.

The vertical tubes 30 and 30a are fitted at their upper ends into a header pipe 32 of substantially rectangular form being set at an angle from the horizontal and having an upper arm 41. The upper header pipe 32 is also provided with cleaning caps or bonnets 37.

In addition to the vertical water tubes 30 and 30a there are provided a plurality of water tubes 39 extending across the opening defined by the rectangular upper header pipe 32. These water tubes 39, like the header pipe 32, are at an angle from the horizontal as shown in Figure 4. Both the vertical tubes 30 and 30a and the top tubes 39 are preferably equipped with finned surfaces 35 to insure a maximum surface for the absorption of heat.

The upper arm 41 of the upper header pipe 32 is equipped with two openings 40 for connection with the pipes 22 to the boiler 17. As before described, the lower header pipe 31 is provided with two openings 36 for connection with the pipes 21 from the boiler 17.

From the above description it is thus apparent that water leaving the bottom of the boiler 17 through pipe 21 circulates into the lower header pipe 31 through the vertical water tubes 30 and 30a into the upper header pipe 32, through the water tubes 39, into the upper run 41 of the header pipe 32 and out of the opening 40 back to the boiler. The water leaving the heat exchanger connection is of course heated almost to the boiling point or may be in the form of steam.

The entire smelting furnace-incinerator connection including the upper and lower header pipes, the water tubes, the cover plate and the back water wall 55 is mounted on a pair of I beams constituting a frame 83. The frame 83 is suspended from carriages 23 mounted by means of rollers on tracks 24. The tracks 24 are supported by I beams 25. Pipes 21 and 22 are equipped with slip joints 26 and 27 (Figure 1) which are readily detachable. It is thus apparent that the entire smelting furnace-incinerator connection may be moved from operative position by merely rolling it along the tracks 24. This permits access to the interior of both the furnaces as well as to the interior of the connection itself.

Another feature of our invention, as best shown in Figure 3 includes the injection of air through nozzles 75 located slightly above the bottom header pipe 31. As shown in Figure 3, air from any source is introduced through pipe lines 70 into branch pipes 71, 72, 73, and 74, each of which is provided at its extremity with an air nozzle 75. The air nozzles 75 may be manually set by means of valves 76 as shown.

The purpose of introducing air at the lower portion of the incinerator connection is to provide a turbulent air stream at the point where gases are first leaving the smelting furnace. Air introduced at this point greatly aids combustion without creating oxidizing conditions in the smelting furnace. This arrangement overcomes the necessity of adding large quantities of air in the combustion chamber after the gases have passed through the incinerator. In this manner the gases are supplied with sufficient air to promote almost complete combustion at their point of entry into the incinerator furnace. The operation of the system in this manner is made possible by means of our heat exchanger connection since connections used heretofore would not withstand the additional heat generated by further combustion of the gases passing to the rotating incinerator.

We are aware that many changes may be made and numerous details of construction may be varied through a wide range without departing from the principles of our invention, and we therefore do not purpose limiting the patent granted hereon otherwise than necessitated by the prior art.

We claim as our invention:

1. A connection for a rotating furnace and a smelting furnace substantially at right angles to said rotating furnace, which comprises a gas-tight passageway between said furnaces, a U-shaped header at the lower end of said passageway, a header forming a hollow rectangle at the top of said passageway, heat exchanger water tubes extending between said headers and connected thereto, additional heat exchanger water tubes in the upper header, pipe means connecting said upper and lower headers to the steam and water compartments respectively of a steam boiler, whereby part of the heat of the material passing between said furnaces is used to generate steam by heating the water in the heat exchanger tubes extending along the passageway.

2. In combination with a substantially horizontal rotating furnace having a water cooled lip portion rotating therewith and a stationary vertical furnace below said rotating furnace, a connection for the passage of gaseous and solid materials between said furnaces comprising a hollow back wall for the passage of water therethrough and for feeding water to said rotating water cooled lip, an unobstructed passageway for the passing of gaseous and solid materials between said furnaces, heat exchanger tubes extending along the sides and top of said connection, upper and lower header pipes connecting said heat exchanger tubes and means for supporting said connection independent of said furnaces.

3. In combination with a stationary vertical furnace having a water cooled pan on the top thereof and a substantially horizontal rotating furnace having a water cooled rotating lip at its discharge end, a heat exchanger connection for said furnaces comprising a water cooled back wall surrounding said rotating lip, means for discharging water from said wall to said rotating lip and means for receiving water from said lip for feeding said water to said pan.

4. In combination with a rotating horizontal furnace having a water cooled lip at its discharge end and a vertical stationary furnace, a movable heat exchanger connection including a hollow rectangular water cooled frame surrounding said water cooled lip, overflow means for transmitting water from said frame to said lip, heat exchanger tubes supported by said frame, said tubes being adapted for circulating water therethrough to a steam boiler, a track and carriage means for supporting said connection on said track, said connection being readily rolled out of operative position for cleaning and repair purposes.

5. A connector for joining the solids discharge end of a horizontal rotary incinerator and the top of a vertical stationary furnace to permit passage of gaseous and solid products between the incinerator and furnace which comprises a gas-tight passageway for the gases rising from the furnace and the solids emitted from the incinerator, an annular wall forming the back of said passage circumscribing said incinerator discharge end to permit rotation of the incinerator therein without permitting the escape of gases and solids therefrom, heat exchanger tubes in the path of the gases from the furnace along the sides and top of said connector and means for circulating a fluid through said tubes to absorb part of the heat from said gases and cool the connector.

6. A connector for joining the discharge end of a horizontal rotary incinerator and the top of a vertical stationary furnace for the unobstructed passage of solids and gases therethrough comprising an annular water-cooled ring circumscribing said discharge end of the incinerator to permit rotation of the incinerator therein, overflow means for flowing water from said ring around said discharge end of the incinerator, heat exchanger pipes directly in the path of the gases disposed around the sides of the connector to absorb part of the heat from the gases passing therethrough, a frame for supporting said connector, a track, and carriages movable on said track secured to said frame to permit the ready removal of the connector from operating position.

7. In a black liquor heat recovery system including a stationary vertical furnace for the burning of black liquor ash therein and a horizontal rotating incinerator for drying the black liquor, a connector for forming a substantially gas-tight passage between said furnace and said incinerator comprising a plurality of heat exchanger pipes in the path of the gases from the furnace, means for circulating water through said pipes to absorb part of the heat of the gases and insulated covers enclosing said pipes in the gas-tight passage whereby solids from the incinerator are transmitted to the furnace and gases from the furnace are passed through the incinerator while part of their heat is absorbed by the water in the heat exchanger pipes for use in other parts of the apparatus.

8. In combination with a horizontal rotating incinerator having a water-cooled lip on one end thereof rotating therewith, and a vertical stationary furnace, a stationary gas-tight connection joining said incinerator and furnace to permit the passage of gaseous and solid products between the incinerator and furnace comprising a passageway for said products, a water-cooled ring at the back of said passageway circumscribing said water-cooled lip, means for transmitting water from said ring to said lip, heat exchanger tubes extending along the sides and top of said connector and means for circulating water through said tubes to absorb part of the heat from said gases passing through the connector while cooling the connector at the same time.

ADOLPH W. WAERN.
LEO F. BUNDE.